United States Patent [19]

Ingram

[11] 4,281,783
[45] Aug. 4, 1981

[54] DETACHABLE LUGGAGE CARRIER FOR AUTOMOBILES

[75] Inventor: Charles E. Ingram, Warren, Mich.

[73] Assignee: Four Star Corporation, Troy, Mich.

[21] Appl. No.: 947,396

[22] Filed: Oct. 2, 1978

[51] Int. Cl.³ .............................................. B60R 9/04
[52] U.S. Cl. .................................. 224/325; 224/309; 248/221.3
[58] Field of Search ............... 224/273, 309, 314, 315, 224/325, 326, 330, 42.45 R; 248/221.3, 222.1, 501, 503; 403/327, 328, 325, 375, 10; 52/704, 711, 709; 292/336.3, DIG. 5; 16/114 R; 105/385, 384

[56] References Cited

U.S. PATENT DOCUMENTS

| | | | |
|---|---|---|---|
| 661,558 | 11/1900 | Shuff | 403/328 X |
| 2,537,750 | 1/1951 | Gretschel | 16/114 R X |
| 3,838,802 | 10/1974 | Grycel | 224/326 X |
| 4,029,038 | 6/1977 | Pfahl | 248/221.3 X |
| 4,113,221 | 9/1978 | Wehner | 403/328 X |

Primary Examiner—Robert J. Spar
Assistant Examiner—Jerold M. Forsberg
Attorney, Agent, or Firm—Reising, Ethington, Barnard, Perry & Brooks

[57] ABSTRACT

A luggage carrier is adapted to be removably secured to the trunk lid of an automotive vehicle. The carrier includes a frame section, carried on the outside surface of the trunk lid and having a plurality of leg members that extend through aligned apertures in the trunk lid into engagement with fastening devices that are carried on the inside surface of the trunk lid. The fastening devices releasably secure the luggage carrier to the trunk lid. Covers are provided to enclose the apertures to provide a pleasing appearance when the luggage carrier is removed from the trunk lid.

5 Claims, 12 Drawing Figures

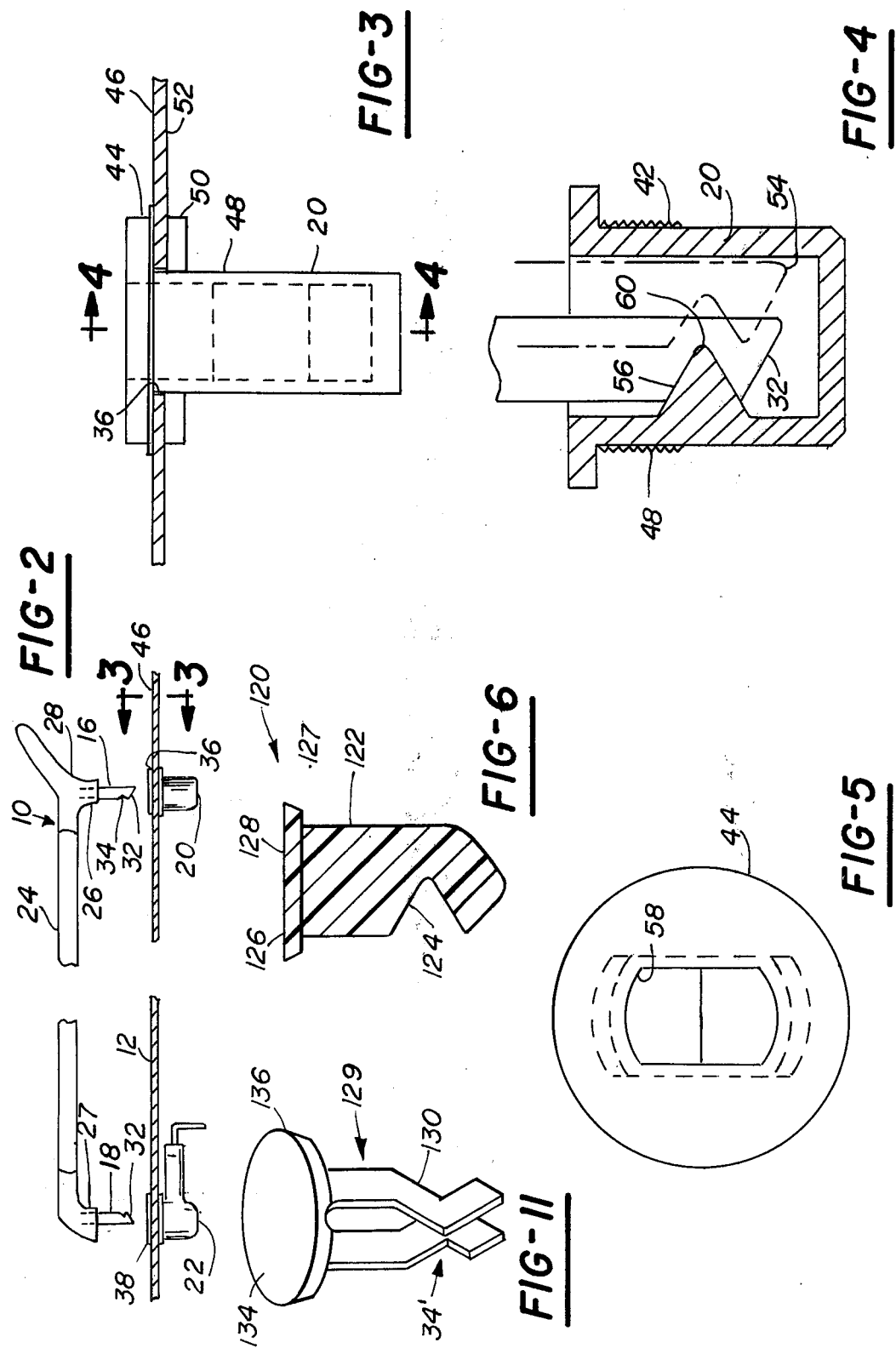

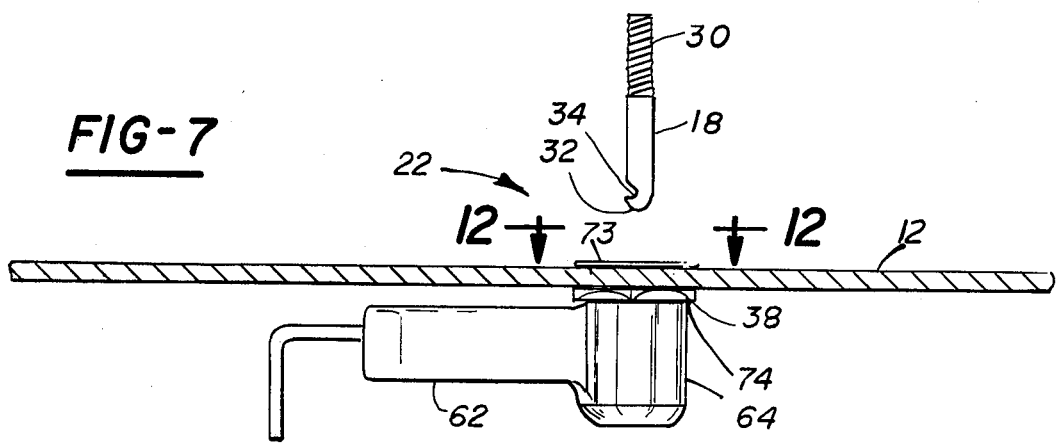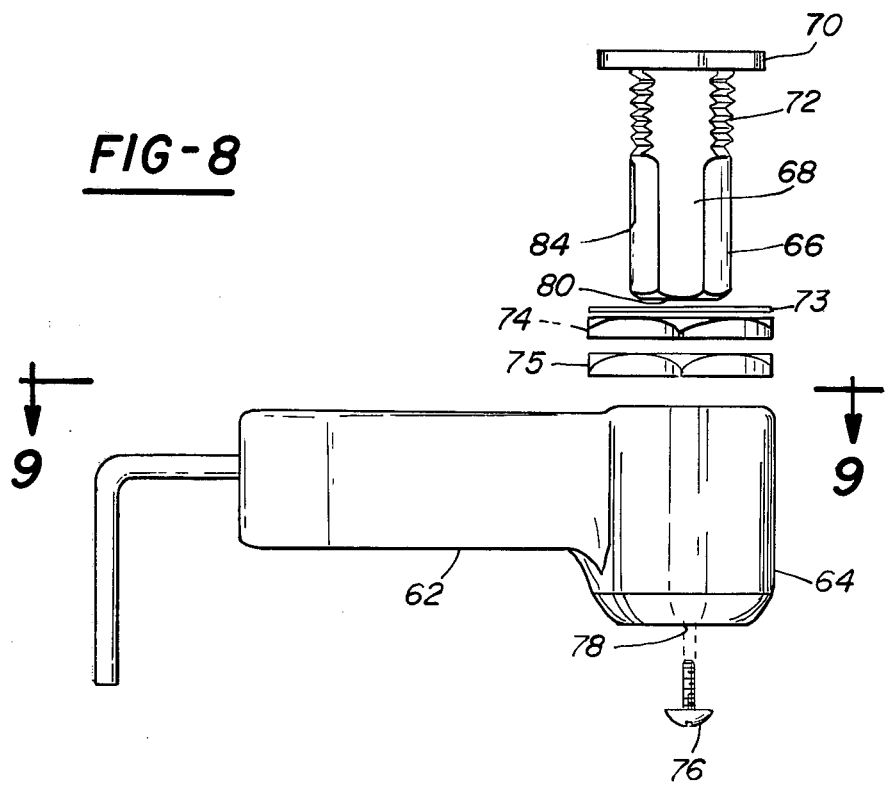

4,281,783

DETACHABLE LUGGAGE CARRIER FOR AUTOMOBILES

BACKGROUND OF THE INVENTION

I. Field of the Invention

The present invention relates to vehicle luggage carriers which can be readily attached to and disengaged from a vehicle and, more particularly, the present invention relates to a vehicle luggage carrier which can be releasably secured to the trunk lid of a vehicle for supplementing the vehicle's luggage carrying capacity.

II. Description of the Prior Art

A number of luggage carriers for use with vehicles, such as automobiles, are well known in the prior art. A review of the appropriate and applicable patents reveals that hundreds of various design configurations are known. In some instances luggage carriers are specifically designed to be releasably attached to portions of the vehicle body, and in many cases the luggage carriers are very difficult to attach or remove from the vehicle and frequently may be of a complicated design, making their manufacture very expensive. Because of the energy crisis and, more particularly, the fuel shortage recently experienced in the United States, there has been a dramatic shift in the ownership from the big American vehicle to a smaller, economy-sized vehicle. This is dramatized by the substantial increase in the sales of smaller, more economical automobiles and the down sizing of the larger automobiles in order for the automobiles to comply with government mandated fuel standards. It is readily recognized that when a shift is made from the larger size vehicle to the smaller size vehicle, there is a corresponding loss in luggage carrying capacity of the particular vehicle. Accordingly, it would not only be desirable to provide a luggage carrier for supplementing the loss of luggage carrying capacity, but also to provide one which can be readily secured to and detached from a vehicle and one which can be so removed in a simple and efficient manner. It would also be desirable to provide a luggage carrier which is attractive in appearance while mounted to the automobile and which will not mar or damage the surface finish of the automobile when in use.

III. Prior Art Statement

The aforementioned prior art constitutes the most relevant prior art of which applicant is aware.

SUMMARY OF THE INVENTION

The present invention, which will be described subsequently in greater detail, comprises a luggage carrier adapted to be releasably secured to the trunk lid of a vehicle, such as an automobile. The luggage carrier comprises a frame section carried on the outside surface of the trunk lid, the frame section having a plurality of legs extending through apertures in the trunk lid. The bottom side of the trunk lid is provided with a plurality of fastening devices aligned with the trunk lid and adapted to releasably engage the frame section legs so as to releasably secure the luggage carrier to the trunk lid. When the carrier has been removed from the trunk lid, a plurality of covers are provided for engagement with the fastening means to enclose the apertures in the trunk lid and provide for a pleasing appearance to the outside surface of the trunk lid.

It is therefore an object of the present invention to provide a luggage carrier which can be readily attached and disengaged from a vehicle, such as an automobile.

It is another object of the present invention to provide an improved luggage carrier which is inexpensive and relatively simple in its construction, while at the same time providing a luggage carrier which solves many of the problems experienced by vehicles requiring supplemental luggage carrying capacity.

Other objects, advantages and applications of the present invention will become apparent to those skilled in the art of luggage carriers when the accompanying description of one example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 2 is a fragmentary, partially sectioned, side elevational view of the luggage carrier and trunk lid illustrated in FIG. 1 of the drawings;

FIG. 3 is an enlarged, fragmentary end view of one of the fastening devices employed in securing the luggage carrier to the trunk lid and as seen from line 3—3 of FIG. 2;

FIG. 4 is a fragmentary, partially sectioned view of the fastening device taken along line 4—4 of FIG. 3;

FIG. 5 is a fragmentary, top elevational view of FIG. 4;

FIG. 6 is a cross-sectional view through a plug utilized to enclose the fastening device illustrated in FIGS. 3, 4 and 5 of the drawings when the luggage carrier is not in use;

FIG. 7 is an enlarged, side elevational view of a second form of a fastening device utilized for releasably securing the luggage carrier to the trunk lid;

FIG. 8 is an enlarged, partially exploded, side elevational view of the fastening device illustrated in FIG. 7;

FIG. 11 is a perspective view of a plug member used to enclose the mechanism illustrated in FIGS. 7 through 10 of the drawings when the luggage carrier is not in use.

DESCRIPTION OF THE PREFERRED EMBODIMENT

Figure 1:
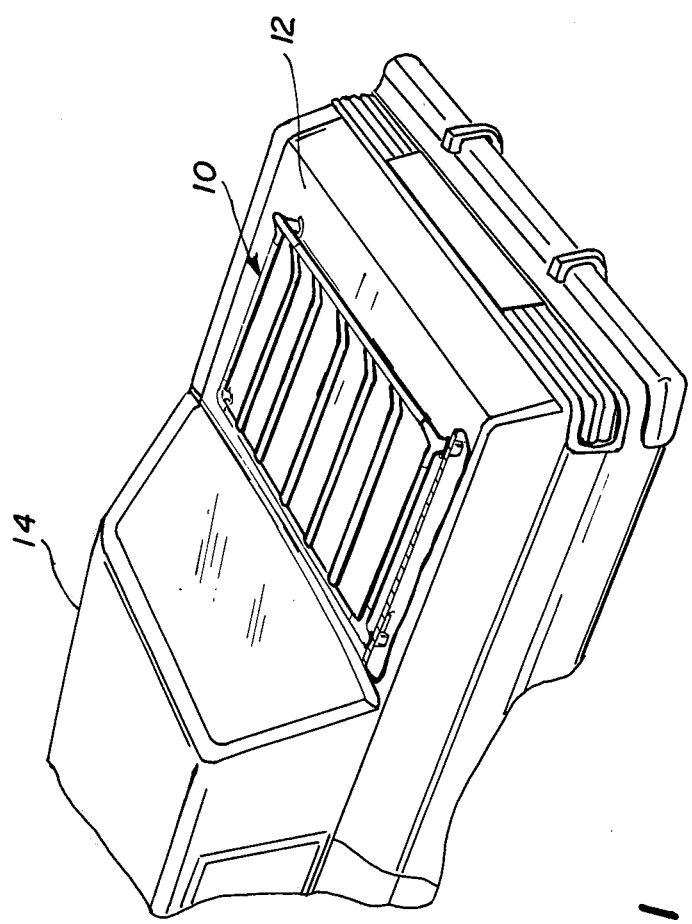
FIG. 1 is a fragmentary, perspective view illustrating a luggage carrier constructed in accordance with the principles of the present invention with the luggage carrier being secured to the trunk lid of a vehicle.

Referring now to the drawings and, in particular, to FIG. 1 wherein there is illustrated one example of the present invention in the form of a luggage carrier 10 which is adapted to be releasably secured to the trunk lid 12 of a vehicle, such as an automobile 14. As can best be seen in FIG. 2 of the drawings, the carrier 10 has rear leg members 16 and forward leg members 18 which are, respectively, received by rear fastening members 20 and forward fastening members 22 for the purpose of releasably securing the luggage carrier 10 to the lid 12. The luggage carrier 10 is conventional in its configuration in that it includes longitudinal and transverse members 24 which provide a convenient means for the carrying of luggage by the vehicle 14. Each corner of the luggage carrier 12 is provided with an enlarged forward boss 27 and a rearward boss 26 which have an internal threaded bore 28 (FIG. 2) adapted to receive the threaded end 30 (FIG. 7) of the legs 16 (or 18). As can best be seen in FIGS. 2 and 7 of the drawings, the lower ends of the legs 16 and 18 are provided with cam surfaces 32, while a locking recess 34 is provided on the inside surfaces thereof, for a purpose which will be described hereinafter. The trunk lid 12 is provided with a plurality of apertures 36 and 38 which, respectively, correspond with the distances between the rear bosses 26 and the forward bosses 27 such that when the carrier 10 is placed on the trunk lid 12 in a manner described hereinafter, the legs 16 and 18 are respectively received within the apertures 36 and 38. The rear apertures 38 of the trunk lid 12 mount the rear fastening devices 20 which, as can best be seen in FIGS. 3, 4 and 5, comprise a housing section 42 that has a radial flange 44 such that when the housing section 42 is inserted through the aperture 36, the radial flange 44 abuts the outer surface 46 of the trunk lid 12. The outer surface of the housing section 42 is threaded at 48 to receive a threaded nut 50 which abuts against the inside trunk lid surface 52, thereby securing the device 20 to the trunk lid 12. The interior 54 of the fastening device 20 has a V-shaped locking flange 56 which is adapted to engage the locking recess 34 formed in the leg 16.

As can best be seen in FIG. 5 of the drawings, the opening 58 into the interior 54 of the housing section 42 is elongated such that the frame leg 16 may be inserted into the opening 58, while the locking recess 34 engages the locking flange 56. At the same time the elongated opening 58 permits the leg 16 to pivot about the point 60 for a purpose which will be described hereinafter.

Referring now to FIGS. 7 through 10, it can be seen that the locking mechanism 22 comprises an elongated housing 62 which terminates at its one end in a bowl-shaped boss 64. The boss 64 slideably and releasably receives a detent member 66. As can best be seen in FIG. 8, the detent member 66 is an essentially cylindrically shaped element having flat sides 68 which are adapted to be received in a complementary shaped bore 69 formed within the boss 64. The member 66 is provided with a radially extending flange 70 at its top and is further provided with threading at 72 immediate the flange 70 for a purpose to be described hereinafter.

Figure 10:
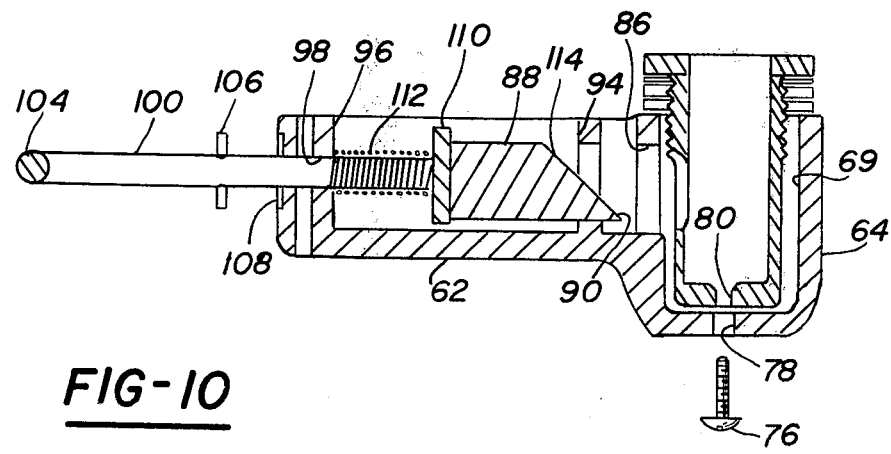
FIG. 10 is a cross-sectional view of the mechanism taken along line 10—10 of FIG. 9 illustrating the detent mechanism in an opened position.

As can best be seen in FIG. 7 of the drawings, during the assembly of the fastening mechanism 22 to the trunk lid 12, the member 66 is inserted through the aperture 38, and a gasket 73 is interposed between the flange 70 and the top of the member 66, abutting the outside surface 46 of the trunk lid 12. A first suitable nut 74 is then threaded onto the threaded surface 72 of the member 66 to tightly secure the member 66 to the trunk lid as the lid is sandwiched between the inside surface of the gasket 73 and the flange 70 and the inside surface of the nut 74. A second nut 75 may then be threaded onto the threaded surface 72 of the member 66. The member 66 is then engaged with and received by the bore 69 in the boss 64, as shown in FIG. 10, the upper surface of the boss 64 abutting the lower surface of the second nut 75. A screw 76 extends through an aperture 78 in the bottom of the boss 64 and is threadingly received within threaded bore 80 at the bottom of the member 66, thereby securely attaching the housing 62 and the mechanism carried thereby to the member 66 and, thus, to the trunk lid 12.

Figure 9:
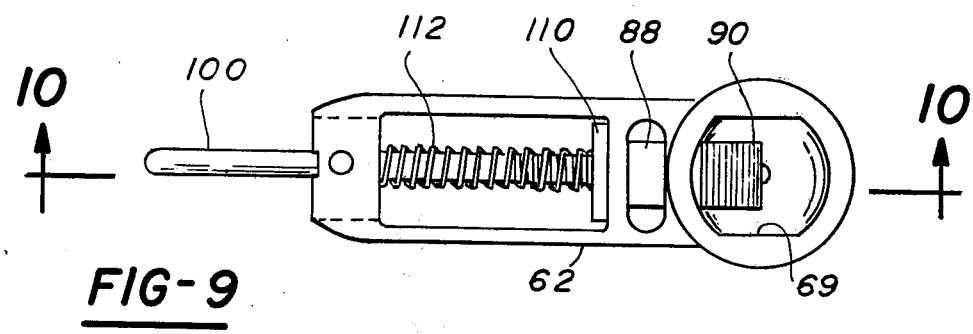
FIG. 9 is a top elevational view of the fastening device as seen from line 9—9 of FIG. 8 illustrating a detent mechanism therein in a locked position.
Figure 12:
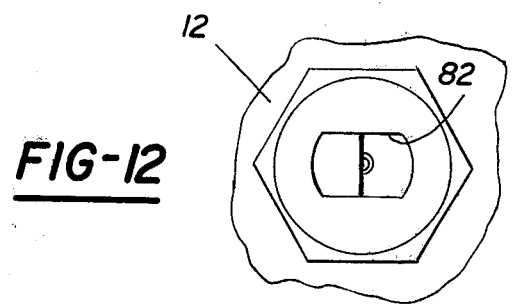
FIG. 12 is a fragmentary top plan view of a lid aperture as seen from line 12—12 of FIG. 7.

It should be noted that the member 66 has a longitudinal bore 82 that extends substantially its full length and, as can best be seen in FIG. 12 of the drawings, the bore 82 is of an elongated shape for a purpose to be described. Intermediate its length, the member 66 has a slot 84 which faces and communicates with a through bore 86 in the housing 62 which, in turn, slideably supports a detent mechanism 88. The detent mechanism 88 is movable to a retracted position, as shown in FIG. 10 of the drawings, from a rest, engaged position, as shown in FIG. 9 of the drawings, wherein the detent mechanism 88 extends through the bore 86 in the housing 62 and through the slot 84 in the member 66 to engage the locking recess 34 formed on the end of the leg 18 when the same has been inserted through the opening 82 and into the locking mechanism 22. It can thus be seen that when the leg 18 is fully inserted within the bore 82 of the member 66 and the detent 88 is shifted to the right, as viewed in FIG. 9, the pointed end 90 of the dentent 88 engages locking recess 34 and thereby secures the forward end of the luggage carrier 10 to the trunk lid 12.

As can best be seen in FIGS. 9 and 10, the housing 62 of the locking mechanism 22 includes laterally spaced partitions 94 and 96, the latter having a through bore 98 that slideably supports a push rod 100. The push rod 100 is secured to the detent mechanism 88 on one end, while its other end has a handle 104. The intermediate section of the push rod 100 has an aperture through which a pin 106 is secured. The outer face of the housing 62 is provided with a pair of right-angle slots 108, 109 which are adapted to receive the pin 106 in a manner which will be described hereinafter.

The inside portion of the detent 88 is provided with a radial flange 110 which abuts the partition 94 to limit the amount of movement of the detent 88 into the bore 86 and, thus, its engagement with the locking pin recess 34. A coil spring 112, carried around the push rod 100, biases the locking detent 88 into engagement with the recess 34 of the leg 18.

The slots 108, 109 are of unequal depth such that when the pin 106 is positioned within the deeper slot, 109 the spring 112 is in its rest position wherein the detent 88 is urged into engagement with the locking pin recess 34, the flange 110 abutting the partition 94.

When it is desired to disengage the detent 88 from the leg 18, the rod 100 is pulled outwardly by grasping the handle 104, thereby drawing the detent 88 back, compressing the spring 112. The detent is retained in this retracted position by rotating the handle 90° to bring the pin 106 into alignment with the shallow slot 108. Thus, when released into the shallow slot 108, the pin 106 will stop the extension of the spring 112, thereby limiting the forward movement of the detent 88, to retain it in a disengaged position.

In use the carrier 10 is placed on the trunk lid 12 in such a manner that its rear legs 16 are received within the fastening mechanisms 20 at the rear portion of the trunk lid 12. The legs 16 are pressed down, slidingly forward; the cams 32 sliding over the locking flange members 56, such that the locking recesses 34 are brought into pivotal engagement with the locking flange members 56, whereupon the luggage carrier 10 is rotated (counterclockwise as viewed in FIGS. 1 and 2)

such that the legs 18 at the forward end of the carrier 10 are received within the elongated slot 82 of the forward fastening devices 22. When the cam ends 32 engage the cam surface 114 formed at the forward end of the detent 88, additional downward pressure against the carrier 10 will cause the detent 88 to move against the bias of the spring 112, thereby permitting the leg to move completely into the opening 82, whereupon the spring 112 will move the detent 88 into engagement with the locking recess 34 to secure the carrier 10 to the lid 12. By grasping the handle 104 and pulling the push rods outwardly, the detent 88 can be disengaged from the locking recess 34 on the leg 18; and by proper rotation of the push rod 100 such that the pin 106 is engaged with the shallow slot 108, the detent 88 can be maintained in the retracted position illustrated in FIG. 10 of the drawings, that is, the position disengaged from the locking recess 34 of the leg 18. In this position the carrier 10 may be rotated upwardly about the pivot point 60 in the mechanism 20, and the carrier 10 may be removed from the trunk lid 12.

After the carrier 10 has been removed, a cover member 120 is inserted into the device 20. The cover member is in the form of a Elastomer or plastic plug (FIG. 6) having a cylindrical section 122 that is shaped complementary to the shape of the bore 54 in the locking mechanism 22. The cover member 120 has an internal notch 124 that is adapted to engage the flange 56. The upper portion of the cover 120 includes a radial flange 126 which remains on the exterior portion of the lid 12, enclosing the aperture 36 and providing for a pleasing appearance of the trunk lid 12. Preferably, the flange 126 is provided with a slanted side wall 127 to facilitate its removal from the lid 12. The upper surface 128 of the plug 120 may be chrome plated or painted to match the surface of the trunk lid.

As can best be seen in FIG. 11 of the drawings, a similarly shaped cover member 129, made of plastic or other suitable material, covers the aperture 38. The cover 129 has a configuration in the form of a leg 130 which is shaped in a manner similar to the leg 18 and includes a locking recess 34' that is adapted to be engaged by the detent 88 so as to secure the cover 129 to the device 23 and to enclose the aperture 38 after the carrier 10 has been removed. Similar to the plug 120, the plug 129 is provided with a radial flange 134, adapted to enclose the opening 82 at the top of a member 66. The flange 134 is preferably provided with a slanted side wall 136 to facilitate its removal and may be chrome plated or painted to match the trunk lid 12, as desired.

It can thus be seen that the present invention has provided a new and improved luggage carrier 10 which has a simple means for securing the same to the trunk lid.

While only one form of the present invention has been disclosed, it should be understood that other forms of applicant's invention may be had, all coming within the spirit of the invention and scope of the appended claims.

What is claimed is as follows:

1. A luggage carrier for a vehicle, said luggage carrier being the type adapted to be mounted to the trunk lid of said vehicle, said luggage carrier comprising:
   a frame section carried on the outside surface of said trunk lid, said frame section having a plurality of upstanding legs adapted to extend through apertures in said truck lid; and
   a plurality of fastening means carried on the inside surface of said trunk lid and each of said plurality of fastening means aligned with a respective one of the apertures, said fastening means releasably engaging said frame legs to releasably secure said frame to the outside surface of said trunk lid,
   wherein one of said fastening means comprises a housing having a bore, said housing being carried by said trunk lid such that said bore is longitudinally aligned with one of said trunk apertures, the frame leg received by said housing having a detent slot, said fastening means housing having a manually operable detent mechanism engagable with said detent slot to secure said leg within said housing, said detent mechanism being biased toward said bore to automatically engage said detent slot upon the insertion of said leg within said aperture into said bore, wherein another of the frame legs has a detent slot and another of said plurality of said fastening means has a flange element pivotally receiving said detent slot of the said another of said frame legs to permit said legs and, thus, said frame to pivot around the flange element of said another fastening means, whereby the fastening means cooperate to attach the carrier to the vehicle.

2. The luggage carrier defined in claim 1 wherein said detent mechanism comprises:
   a second bore in said housing, said second bore traversing said first bore, said detent mechanism including a detent slideably mounted within said housing transverse bore;
   a push rod attached to one end of said detent and extending externally of said housing; and
   spring means disposed between said housing and said detent, encompassing said push rod and biasingly urging said detent toward said first bore and into engagement with said leg slot.

3. The luggage carrier defined in claim 2 wherein said push rod is movable between an extended position, wherein said detent mechanism engages said leg slot, and a retracted position, wherein said detent mechanism is longitudinally moved along said bore and disengaged from said leg locking aperture, and means carried by said push rod externally of said housing for engaging said housing to lock said push rod and, thus, said detent in said second retracted position.

4. The luggage carrier defined in claim 1 wherein said bore of said one fastening means is elongated in a forward-to-rear manner.

5. A luggage carrier for a vehicle, said luggage carrier being the type adapted to be mounted to the trunk lid of said vehicle, said luggage carrier comprising:
   a frame section carried on the outside surface of said trunk lid, said frame section having a plurality of upstanding legs on the rear portion thereof and a plurality of upstanding legs on the forward portion thereof, said legs adapted to extend through apertures in said trunk lid; and
   fastening means carried on the inside surface of said trunk lid and aligned with said apertures, said fastening means releasably engaging said legs to releasably secure said frame to the outside of said trunk lid;
   one of said fastening means being mounted on the forward portion of said trunk lid, said one of said fastening means comprising a housing having a bore, said housing being carried by said trunk lid such that said bore is longitudinally aligned with one of said trunk apertures, the frame leg received by said one aperture having a detent slot, said one of said fastening means housing having a manually operable detent mechanism engagable with said leg slot to secure said leg within said aperture;

a second one of said fastening means being carried on the rear portions of said trunk lid, said second one of said fastening means having a flange element pivotally receiving said slot of another of said frame legs to permit said legs and, thus, said frame to pivot relative to said second fastening means, said bore of said one fastening means being elongated in a foward-to-rear manner to receive said other leg member as said frame is pivoted relative to said second fastening means;

wherein when said rear leg engages said second fastening means on the rear portion of said trunk lid and the carrier is pivoted about said flanges, the forward legs on said frame engage apertures disposed on the forward portion of said lid and are lockingly engaged by the detent mechanisms carried by the fastening means associated with said last-mentioned apertures.

* * * * *